United States Patent [19]
Barrett

[11] Patent Number: 5,845,724
[45] Date of Patent: Dec. 8, 1998

[54] CHILDREN'S RIDE-ON VEHICLE WITH AN AUXILLIARY CONTROL MECHANISM

[75] Inventor: Robert C. Barrett, Angola, N.Y.

[73] Assignee: Mattel, Inc., El Segundo, Calif.

[21] Appl. No.: 696,498

[22] Filed: Aug. 14, 1996

[51] Int. Cl.[6] .............................. B62D 1/22; B60K 26/00
[52] U.S. Cl. ........................ 180/65.1; 180/19.2; 180/321
[58] Field of Search ................................. 180/65.1, 65.6, 180/907, 19.1, 19.2, 19.3, 321, 332; 280/87.01, 87.043, 87.05; 446/454; 74/551.8

[56] References Cited

U.S. PATENT DOCUMENTS

| | | | |
|---|---|---|---|
| 1,540,170 | 6/1925 | Frick | 180/65.6 |
| 1,773,567 | 8/1930 | Bradley | 280/87.043 |
| 2,679,712 | 6/1954 | Schwein et al. | 180/65.1 |
| 2,742,973 | 4/1956 | Johannesen | 180/19.1 |
| 2,816,775 | 12/1957 | Costello | 280/288.4 |
| 2,903,082 | 9/1959 | Marcus | 180/19.1 |
| 2,928,291 | 3/1960 | Wilkerson | 180/19.2 |
| 3,094,185 | 6/1963 | Racoosin | 180/19.3 |
| 3,336,048 | 8/1967 | Papuchi | 74/551.8 |
| 3,935,916 | 2/1976 | Ferraro | 180/219 |
| 4,361,200 | 11/1982 | Igarashi | 180/321 |
| 4,369,856 | 1/1983 | Nudd | 180/321 |
| 4,429,758 | 2/1984 | Meshulam | 180/19.3 |
| 4,476,954 | 10/1984 | Johnson et al. | 180/65.1 |
| 4,643,446 | 2/1987 | Murphy et al. | 180/907 |
| 4,776,415 | 10/1988 | Brice | 180/907 |
| 5,154,096 | 10/1992 | Geller et al. | 74/551.8 |
| 5,280,282 | 1/1994 | Nagafusa et al. | 180/321 |
| 5,306,030 | 4/1994 | Becka | 280/282 |
| 5,531,494 | 7/1996 | Singleton | 74/551.8 |

FOREIGN PATENT DOCUMENTS

| | | | |
|---|---|---|---|
| 479735 | 4/1992 | European Pat. Off. | 180/65.1 |
| 1118023 | 11/1961 | Germany | 180/321 |
| 4206291 | 12/1992 | Germany | 180/19.3 |
| 2274265 | 7/1994 | United Kingdom | 180/65.6 |

*Primary Examiner*—Peter C. English
*Assistant Examiner*—Frank Vanaman
*Attorney, Agent, or Firm*—Kolisch, Hartwell, Dickinson, McCormack & Heuser

[57] ABSTRACT

A child's ride-on vehicle including a body portion configured to carry a child rider and at least three wheels mounted to the body portion and configured to allow the body portion to travel. The vehicle also includes a drive system with an electric motor and a battery, the drive system being activatable and connected to at least one of the wheels to rotate the wheel upon activation to thereby cause the vehicle to travel. A primary motor control system is operatively connected to the drive system and configured to allow the child rider to control activation of the drive system. A primary steering system is operatively connected to at least one of the wheels and configured to allow the child rider to selectively steer the vehicle by causing at least one of the wheels to turn relative to at least one other wheel. A secondary steering system is operatively connected to at least one of the wheels and configured to allow a person positioned near but not on the vehicle to selectively steer the vehicle by causing at least one of the wheels to turn relative to at least one other wheel. The vehicle may also include a secondary motor control system operatively connected to the drive system and configured to allow a person positioned near but not on the vehicle to selectively control the activation of the drive system.

13 Claims, 2 Drawing Sheets

CHILDREN'S RIDE-ON VEHICLE WITH AN AUXILLIARY CONTROL MECHANISM

FIELD OF THE INVENTION

The present invention relates to children's ride-on vehicles, and more particularly to such a vehicle with an auxiliary control system to allow a parent or other child care provider to control operation of the vehicle.

BACKGROUND OF THE INVENTION

Children of all ages enjoy mimicking adult activities. One such activity that is particularly attractive to children is driving a car. Children's ride-on vehicles provide an outlet for this desire for many children. Most children's ride-on vehicles are designed to replicate full-size cars and will typically include a steering wheel for directional control and a gas-pedal-like switch to control a battery-operated electric motor. By proper operation of the controls, children are able to emulate the process of driving a real car.

As with full-size cars, a certain amount of care must be exercised when using a children's ride-on vehicle. For instance, a toddler who lacks the coordination to steer a ride-on vehicle may nonetheless be able to activate the drive system by stepping on the gas-pedal. This problem is not present in pedal-powered toys, such a tricycles, because children usually develop the ability to pedal the toy sometime after they have learned to steer.

Even for older children who can capably control a ride-on vehicle, there are certain environments where it might be dangerous to allow them complete freedom while driving the car. Driving a ride-on vehicle on a sidewalk for example, might be such a situation because of the danger that the child might unexpectedly swerve the vehicle out into the street. The risk associated with operating a ride-on vehicle on a sidewalk is particularly unfortunate because the sidewalk offers a nearly ideal driving surface for such vehicles. Also, even children who are physically capable of reliably directing the vehicle where they want to go do not always apply adequate judgment when choosing the course of the vehicle.

Because of the enjoyment offered to children by operating ride-on vehicles, it is desirable to make such vehicles suitable for use by children of different ages and in varying situations. With the above problems and desires in mind, it is a general object of the present invention to provide a children's ride-on vehicle with an auxiliary control system that can be operated by an adult to control the vehicle as necessary.

It is another object of the present invention to provide a children's ride-on vehicle with an auxiliary control system which includes a secondary steering system to allow the vehicle to be steered remote from a steering system operable by a child rider.

One more object of the present invention is to provide a children's ride-on vehicle with an auxiliary control system including a secondary motor control system that can be operated remote from a motor control system operable by a child rider.

An additional object of the invention is to provide a children's ride-on vehicle with an auxiliary control system that can be operated by an adult standing behind the vehicle to steer and/or control the travel of the vehicle.

Yet another object of the invention is to provide a structure that is rugged enough to tolerate the abuses expected in the operating environment.

SUMMARY OF THE INVENTION

These and other objects are satisfied by providing a child's ride-on vehicle including a body portion configured to carry a child rider and at least three wheels mounted to the body portion and configured to allow the body portion to travel. The vehicle also includes a drive system with an electric motor and a battery, the drive system being activatable and connected to at least one of the wheels to rotate the wheel upon activation to thereby cause the vehicle to travel. A primary motor control system is operatively connected to the drive system and configured to allow the child rider to control activation of the drive system. A primary steering system is operatively connected to at least one of the wheels and configured to allow the child rider to selectively steer the vehicle by causing at least one of the wheels to turn relative to at least one other wheel. A secondary steering system is operatively connected to at least one of the wheels and configured to allow a person positioned near but not on the vehicle to selectively steer the vehicle by causing at least one of the wheels to turn relative to at least one other wheel. The vehicle may also include a secondary motor control system operatively connected to the drive system and configured to allow a person positioned near but not on the vehicle to selectively control the activation of the drive system.

Many other features, advantages and additional objects of the present invention will become manifest to those versed in the art upon making reference to the detailed description which follows and the accompanying sheets of drawings in which preferred embodiments incorporating the principles of this invention are disclosed as illustrative examples only.

DETAILED DESCRIPTION OF THE PREFERRED EMBODIMENT

Figure 1:
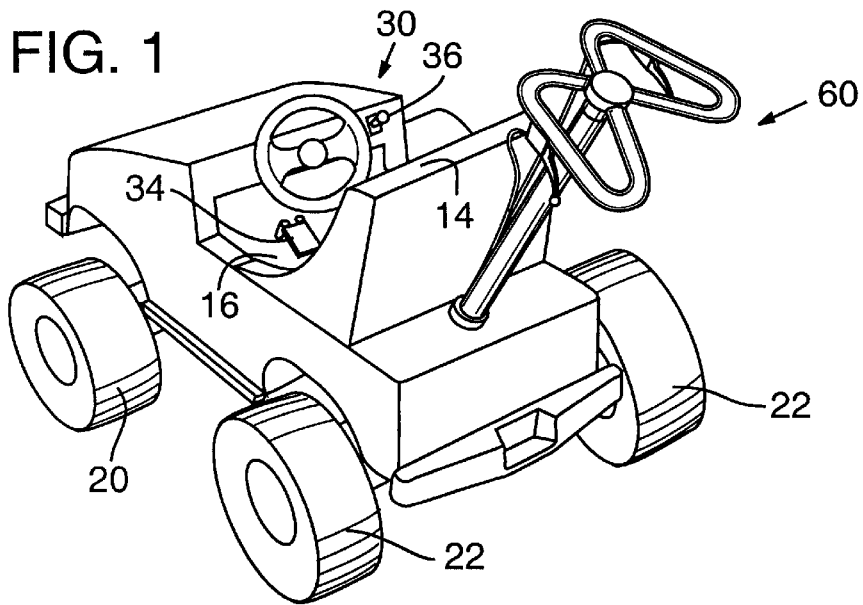
FIG. 1 is a perspective view of a ride-on vehicle constructed according to the present invention.

A ride-on vehicle constructed according to the present invention is shown generally at 10 in FIG. 1. Vehicle 10 includes a body portion 12 which is preferably formed as a unitary structure from molded plastic. Body 12 includes a seat 14 for a child rider to sit in and a floor 16 disposed below and forward of the seat for supporting the rider's feet. It should be noted that positional references in the following description will be made assuming that the vehicle is in an upright position.

Figure 2:
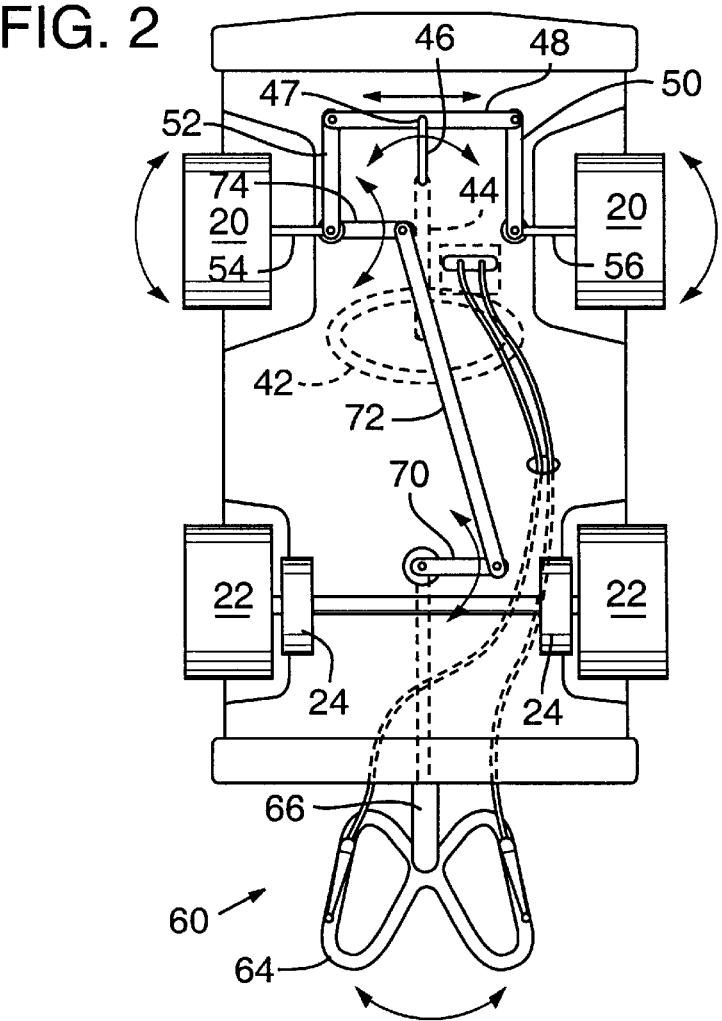
FIG. 2 is a bottom view of a ride-on vehicle of FIG. 1.
Figure 4:
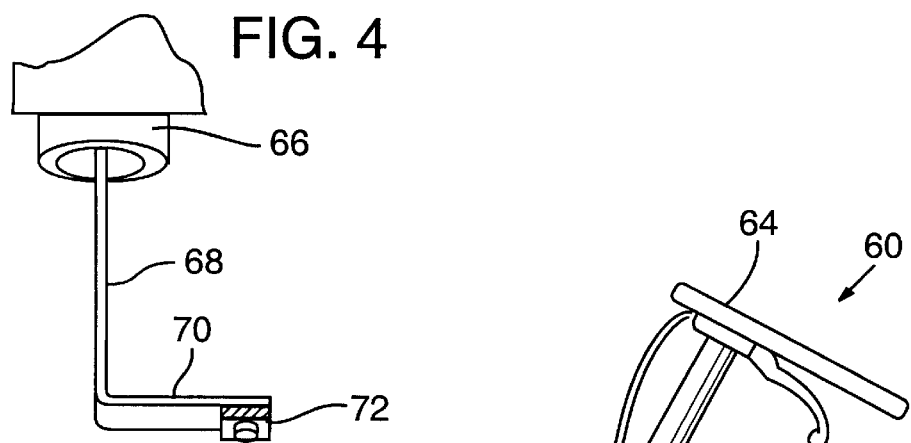
FIG. 4 is a detail view of steering crank along lines 4—4 of FIG. 3.
Figure 3:
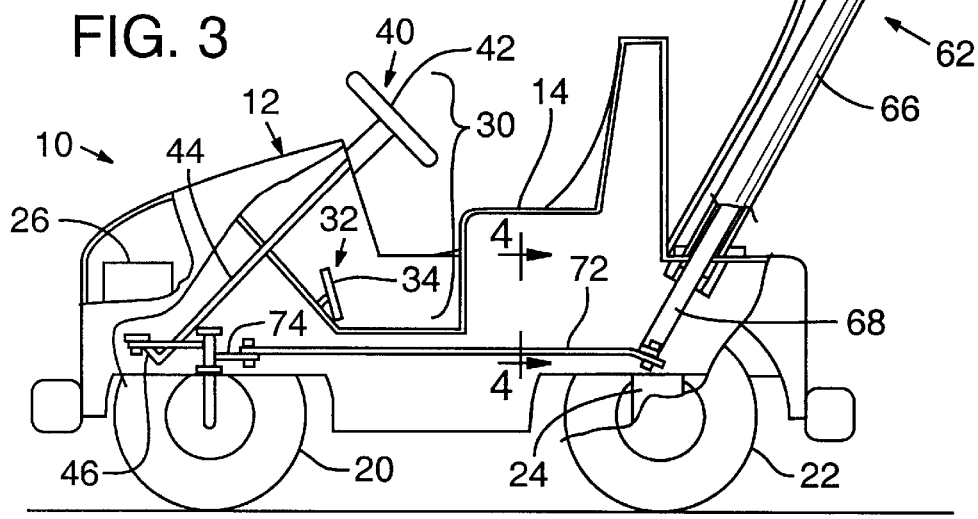
FIG. 3 is partial cutaway side view of the ride-on vehicle of FIG. 1.
Figure 5:
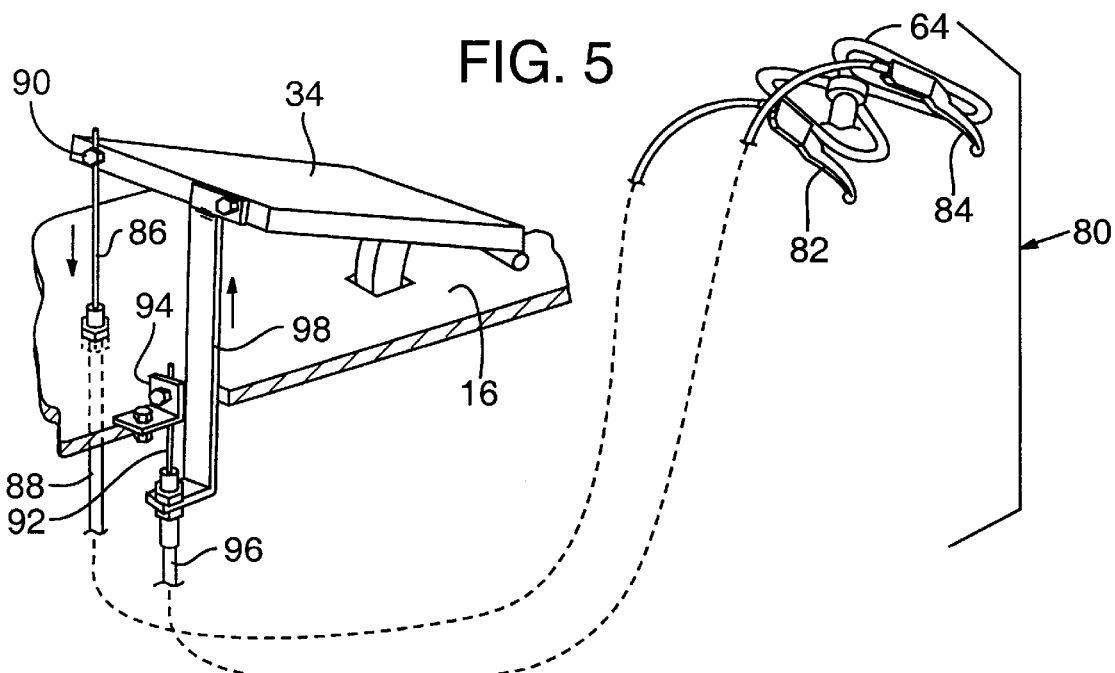
FIG. 5 is a cutaway isometric view of a secondary motor control system according to the present invention.

Body 12 is borne by four wheels, including two steerable front wheels 20, and two rear drive wheels 22. In the preferred embodiment, a drive system in the form of an electric motor gear drive assembly, such as assemblies 24 in FIG. 2, is includes to drive the rear wheels. The motors powering the rear wheels are operated by one or more batteries 26 held in the front of the vehicle, as shown in FIG. 3.

A primary control system 30 is configured to allow the child rider to operate the vehicle. In particular, control system 30 includes a primary motor control system 32 to control flow of power from the battery to the motors. See FIG. 3. Motor control system 32 includes a foot-pedal switch 34 which the child rider can depress to activate or energize the drive system motors. A reversing switch 36, shown in FIG. 1, is also included in the circuit between the motors and the battery to allow the rider to reverse the direction of travel of the vehicle.

Control system 30 also includes a primary steering system 40 which the child rider can use to steer the vehicle. Steering system 40 includes a steering wheel 42 which connects to a shaft 44 which extends down through the bottom of the vehicle to a crank portion 46. The free end of crank portion 46 fits through a hole 47 in a tie rod 48. Tie rod 48 extends between and connects steering arms 50, 52 which are connected to spindles 54, 56 which support front wheels 20. Thus, when the steering wheel is turned, the crank portion shifts the tie rod, which then turns the front wheels to steer the vehicle as it travels.

Vehicle 10 includes an auxiliary control system 60 in addition to primary control system 30. Auxiliary control system 60 includes a secondary steering system 62 having a steering wheel 64 mounted at the top of a post 66. Post 66 extends up from the back of the vehicle to position the steering wheel for comfortable use by an adult standing behind the vehicle. A shaft 68 extends from steering wheel 64 down post 66 to a crank arm 70 located beneath body 12. Crank arm 70 is connected by a steering rod 72 to a spindle crank 74 secured to spindle 54. This arrangement permits the adult to steer the vehicle by turning steering wheel 64. Because the adult supervisor will typically be stronger than the child rider, the adult will be able to overcome any improper attempt by the child to steer as required to maintain safe directional control of the vehicle. It should be noted that the secondary steering control system could also be implemented using a cable drive system to turn the front wheels similar to the system used for motor control described below.

Auxiliary control system 60 also includes a secondary motor control system 80. Motor control system 80 provides a remote mechanical linkage for turning the motor on and off and includes an on-lever 82 and an off-lever 84 mounted to steering wheel 64. On-lever 82 is connected through a cable 86 to foot pedal 34. A cable sheath 88 which encloses the cable is secured to the floor of the vehicle and the end of the cable is held to the free end of the foot pedal by a clamp 90. When on-lever 82 activated by being squeezed toward steering wheel 64, it draws the cable back, which pulls the foot pedal down toward the floor to activate the motor.

As with on-lever 82, off-lever 84 is connected through a cable 92 to foot pedal 34. The free end of the off-lever cable is secured to the floor of the vehicle with clamp 94. A cable sheath 96 surrounds most of cable 92 and is attached to the foot pedal through an elongate pedal raising bracket 98. Bracket 98 is bolted to pedal 34 and extends downward through the floor to a ledge where sheath 96 is attached. When off-lever 84 is activated by being squeezed toward steering wheel, the cable is pulled back in the sheath and the bracket and foot-pedal urged upward as the end of the sheath slides toward the end of the cable. This causes the foot pedal to be raised, thereby deactivating the motor and stopping the vehicle.

Even though the preferred embodiment makes use of a mechanical cable linkage to implement the secondary motor control, it will be understood by those of skill in the art that the same function could be achieved using one or more electrical switches to bypass or override the foot pedal switch. Such switches could be mounted on or near the steering wheel, or even in a separate housing connected only by wires to the vehicle. It should also be recognized that many of the benefits of the present invention can be obtained by a secondary motor control even without the secondary steering system. This is because the parent or other supervisor would have the ability with the secondary motor control system to stop the vehicle if further travel would result in a dangerous situation.

While the present invention has been shown and described with reference to the foregoing preferred embodiment, it is to be understood by those of skill in the art that other changes in form and detail may be made therein without departing from the spirit and scope of the invention as defined in the appended claims.

It is claimed and desired to secure by Letters Patent:

1. A child's ride-on vehicle comprising:

a body portion configured to carry a child rider;

at least three wheels mounted to the body portion and configured to allow the body portion to travel;

a drive system including an electric motor and a battery, the drive system being activatable and connected to at least one of the wheels to rotate the wheel upon activation to thereby cause the vehicle to travel;

a primary motor control system operatively connected to the drive system and configured to allow the child rider to control activation of the drive system;

a primary steering system operatively connected to at least one of the wheels, the primary steering system being configured to allow the child rider to selectively steer the vehicle by causing at least one of the wheels to turn relative to at least one other wheel; and a secondary steering system operatively connected to at least one of the wheels, the secondary steering system being configured to be operated in cooperation with the primary steering system to thereby allow a person positioned near but not on the vehicle to selectively override the steering of the vehicle by the child rider by steering the vehicle by causing at least one of the wheels to turn relative to at least one other wheel.

2. The ride-on vehicle of claim 1, wherein the body portion has a front region and a rear region and the secondary steering system includes a steering wheel rotatably mounted on a post projecting upwardly from the rear region of the body portion.

3. The ride-on vehicle of claim 2, wherein the vehicle includes two steerable front wheels disposed near the front region of the body portion, each front wheel being rotatably mounted on a spindle which is pivotally coupled to the body portion to allow the wheels to turn about a vertical axis as the spindles pivot, and the secondary steering system further includes a crank arm disposed adjacent an end of the post opposite the steering wheel, the crank being rotatably coupled to the steering wheel and connected through a steering rod to a spindle crank secured to one of the spindles, whereby rotation of the steering wheel causes the steerable wheels to turn.

4. The ride-on vehicle of claim 2, further comprising a secondary motor control system operatively connected to the drive system and configured to be operated in cooperation with the primary motor control system to thereby allow a person positioned near but not on the vehicle to selectively override the activation of the drive system by the child driver by controlling the activation of the drive system.

5. The ride-on vehicle of claim 4, wherein the secondary motor control system is operable to selectively activate and deactivate the drive system.

6. The ride-on vehicle of claim 4, wherein the primary motor control system includes a foot-pedal switch disposed between the battery and the motor to selectively allow power from the battery to flow to the motor, and wherein secondary motor control system includes a mechanical linkage extending from proximal the steering wheel to the foot-pedal, the linkage being configured to allow a person positioned near but not on the vehicle to selectively control operation of the foot-pedal switch without releasing the steering wheel.

7. The ride-on vehicle of claim 6, wherein the mechanical linkage in the secondary motor control system includes an on-lever and an off-lever, each lever being connected through a cable to the foot-pedal, the cable connected to the on-lever, being configured to pull the foot-pedal switch down to activate the drive system when the on-lever is engaged and the cable connected to the off-lever being configured to urge the foot-pedal up to deactivate the drive system when the off-lever is engaged.

8. The ride-on vehicle of claim 6, wherein the mechanical linkage in the secondary motor control system includes an on-lever and an off-lever disposed proximal the steering wheel, a first cable having a first end connected to the on-lever and a second end connected to the foot-pedal, the first cable being configured to pull the foot-pedal down to activate the drive system when the on-lever is engaged, and a second cable having a first end connected to the off-lever and a second end connected to the foot pedal, the second cable being configured to urge the foot pedal up to deactivate the drive system when the off-lever is engaged.

9. A child's ride-on vehicle comprising:

a body portion configured to carry a child rider;

at least three wheels mounted to the body portion and configured to allow the body portion to travel;

a drive system including an electric motor and a battery, the drive system being operatively connected to at least one of the wheels to selectively rotate the wheel to thereby cause the vehicle to travel;

a primary steering system operatively connected to at least one of the wheels, the first steering system being configured to allow the child rider to selectively steer the vehicle by causing at least one of the wheels to turn relative to at least one other wheel;

a primary motor control system operatively connected to the drive system and configured to allow the child rider to control operation of the drive system; and a secondary motor control system operatively connected to the drive system and configured to be operated in cooperation with the primary motor control system to thereby allow a person positioned near but not on the vehicle to selectively override the activation of the drive system by the child driver by controlling the operation of the drive system.

10. The ride-on vehicle of claim 9, wherein the primary motor control system includes a foot-pedal switch disposed between the battery and the motor to selectively allow power from the battery to flow to the motor and the secondary motor control system is configured to allow a person positioned near but not on the vehicle to selectively override the operation of the primary motor control system.

11. The ride-on vehicle of claim 10, wherein the secondary motor control system is mechanically connected to the foot-pedal switch to control the operation thereof.

12. The ride-on vehicle of claim 10, wherein the secondary motor control system includes an on-lever and an off-lever, a first cable having a first end connected to the on-lever and a second end connected to the foot-pedal, the first cable being configured to pull the foot-pedal down to activate the drive system when the on-lever is engaged, and a second cable having a first end connected to the off-lever and a second end connected to the foot pedal, the second cable being configured to urge the foot pedal up to deactivate the drive system when the off-lever is engaged.

13. The ride-on vehicle of claim 9, wherein the secondary motor control system is operable to selectively activate and deactivate the drive system.

* * * * *